United States Patent
Himmelhan et al.

(10) Patent No.: US 12,497,267 B2
(45) Date of Patent: Dec. 16, 2025

(54) METHOD FOR CONSTRUCTING AN ELEVATOR, AND ELEVATOR

(71) Applicant: Gebhardt Foerdertechnik GmbH, Sinsheim (DE)

(72) Inventors: Reinhold Himmelhan, Waibstadt (DE); Fritz Gebhardt, Sinsheim (DE); Marco Gebhardt, Sinsheim (DE)

(73) Assignee: Gebhardt Foerdertechnik GmbH, Sinsheim (DE)

( * ) Notice: Subject to any disclaimer, the term of this patent is extended or adjusted under 35 U.S.C. 154(b) by 322 days.

(21) Appl. No.: 17/998,470

(22) PCT Filed: Apr. 14, 2021

(86) PCT No.: PCT/DE2021/200047
§ 371 (c)(1),
(2) Date: Nov. 10, 2022

(87) PCT Pub. No.: WO2021/233504
PCT Pub. Date: Nov. 25, 2021

(65) Prior Publication Data
US 2023/0211981 A1    Jul. 6, 2023

(30) Foreign Application Priority Data
May 18, 2020   (DE) .................. 10 2020 206 194.7

(51) Int. Cl.
*E04F 17/00*   (2006.01)
*B66B 19/00*   (2006.01)
*B66F 3/46*    (2006.01)

(52) U.S. Cl.
CPC ............ *B66B 19/00* (2013.01); *B66F 3/46* (2013.01); *E04F 17/005* (2013.01)

(58) Field of Classification Search
CPC ......... E04H 12/34; E04H 12/344; E04B 1/34; E04B 1/35; E04B 1/3511; E04B 1/3516;
(Continued)

(56) References Cited

U.S. PATENT DOCUMENTS 3,185,265 A    5/1965  White
3,579,935 A *  5/1971  Regan ................... E04B 1/3511
                                                          254/105
(Continued)

FOREIGN PATENT DOCUMENTS

CN    107060275 A    8/2017
DE      2157669 A1   5/1973
(Continued)

OTHER PUBLICATIONS

Machine translation (Year: 1993).*
(Continued)

*Primary Examiner* — Jessica L Laux
(74) *Attorney, Agent, or Firm* — Seed Intellectual Property Law Group LLP

(57) ABSTRACT

With a view to a quick and safe construction of an elevator using structurally simple and cost-effective means, a method for constructing an elevator in particular, a freight elevator—on a construction site, and preferably in a factory hall. The elevator is built from several components arranged one atop the other. The method includes providing a base for the elevator; positioning a lifting device on the base; raising an upper component of the elevator by way of the lifting device; positioning a lower component, which is to be arranged underneath the upper component, under the raised upper component; lowering the upper component onto the lower component by way of the lifting device; and removing the lifting device from the base. Further specified is an elevator constructed according to said method.

11 Claims, 2 Drawing Sheets

(58) Field of Classification Search
CPC ............ E04B 1/3522; E04B 2001/3588; E04F 17/005
See application file for complete search history.

(56) References Cited

U.S. PATENT DOCUMENTS

| | | | | |
|---|---|---|---|---|
| 3,692,446 | A * | 9/1972 | Vanderklaauw | ...... E04B 1/3511 425/63 |
| 3,831,902 | A * | 8/1974 | Vanderklaauw | ...... E04B 1/3505 254/105 |
| 5,577,362 | A * | 11/1996 | Yamashita | ................ E04B 1/24 52/745.1 |
| 9,416,595 | B2 | 8/2016 | Petrello et al. | |
| 2009/0087311 | A1 * | 4/2009 | Wyborn | .................. F03D 13/22 29/889 |
| 2020/0284026 | A1 * | 9/2020 | Houston | ............... E04B 1/3404 |

FOREIGN PATENT DOCUMENTS

| | | |
|---|---|---|
| EP | 3812337 A1 | 4/2021 |
| JP | H05201648 A | 8/1993 |
| JP | H09165160 A | 6/1997 |
| WO | WO 2015001148 A1 | 1/2015 |

OTHER PUBLICATIONS

International Preliminary Report on Patentability & Written Opinion, dated Dec. 1, 2022, for International Patent Application No. PCT/DE2021/200047. (16 pages).

* cited by examiner

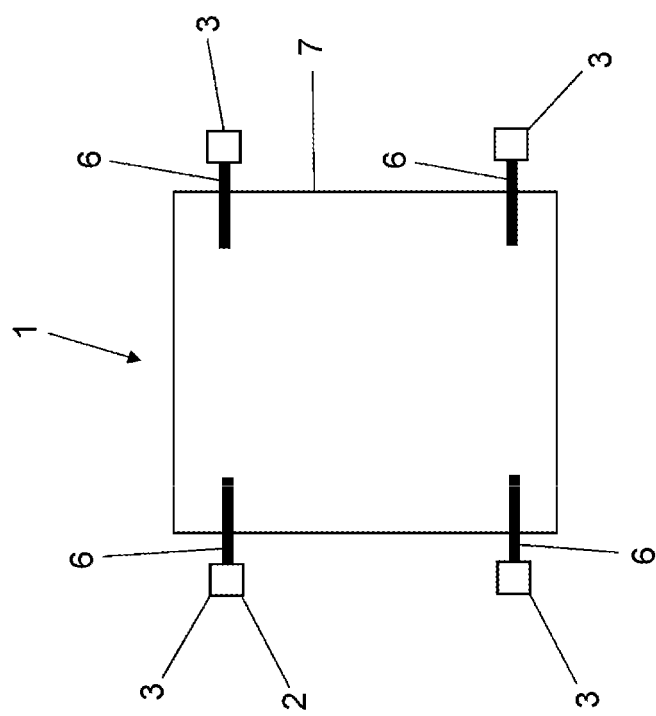

METHOD FOR CONSTRUCTING AN ELEVATOR, AND ELEVATOR

BACKGROUND

Technical Field

The disclosure relates to a method for constructing an elevator—in particular, a freight elevator—on a construction site, and preferably in a factory hall, wherein the elevator is built from several components arranged one atop the other.

The disclosure further relates to an elevator constructed by way of the above method.

Description of the Related Art

Methods for constructing an elevator and elevators of the type mentioned at the outset are known from practice and exist in different embodiments. It is known, for example, to construct elevators floor by floor, and thus also one component after the other, one atop the other. Starting with the lowermost floor or component, which is positioned on a base, the subsequent floors or components are successively constructed one atop the other until the uppermost floor or component usually forms the end of the elevator. In this case, the floors or components can be mounted manually by means of scaffolds to be built correspondingly high. Alternatively or additionally, suitable cranes that place individual components one atop the other can be used. Depending upon the desired height of the elevator, correspondingly large and powerful cranes that can lift components to the desired height are to be used.

A method for mounting a structure in the form of a crane is furthermore known from the prior art according to DE 2 157 669 A, according to which support posts are placed under upright parts by means of complex guides.

The known methods are very material-intensive due to the scaffolds and/or large cranes and/or complex guides to be used. In addition, manual mounting of the individual floors or components one atop the other is usually very time-consuming, since each individual component ultimately has to be assembled from its individual constituents during its mounting on a lower component. Both the large amount of material and the great amount of time required for manual mounting are very cost-intensive and, for example in the case of retrofitting an elevator on a construction site or in a factory hall, frequently cause long standstill times of other construction activities or usual factory activities, which are frequently required for safety reasons for fitters of the elevator or for further persons working on a construction site or in a factory hall.

BRIEF SUMMARY

The present disclosure provides various embodiments of a method and an elevator of the type mentioned at the outset, according to which quick and safe construction of an elevator is made possible with structurally simple and cost-effective means.

The present disclosure describes aspects and features of various methods by which an elevator can be constructed according to the methods.

In at least one embodiment, a method as disclosed herein includes the following steps:
providing a base for the elevator;
positioning a lifting device on the base;
raising an upper component of the elevator by way of the lifting device;
positioning a lower component, which is to be arranged underneath the upper component, under the raised upper component;
lowering the upper component onto the lower component by way of the lifting device; and
removing the lifting device from the base.

It has been found according to the disclosure that an elevator is achieved in a surprisingly simple manner by a clever sequence of method steps, with a departure from previous construction methods. In the process, a base for the elevator is provided first. A lifting device is then positioned on the base, and an upper component of the elevator is raised by way of the lifting device. This upper component can already be arranged on the base prior to the positioning of the lifting device on the base. In this case, care must be taken to ensure that the lifting device can still be positioned in a suitable manner relative to the upper component, in order to enable safe raising of the upper component. Where appropriate, the lifting device must in this case be lifted above an optionally present frame element or rod system element of the upper component using an additional lifting means, and must subsequently be placed onto the base.

After the upper component has been raised, a lower component, which is to be arranged underneath the upper component, is positioned under the raised upper component. If required, a suitable adjustment step of the lower component relative to the upper component is associated with this positioning of the lower component, so that subsequent lowering of the upper component onto the lower component by way of the lifting device can take place in a precise manner in the desired relative positioning and orientation of the upper component in relation to the lower component. The upper component and the lower component can now be fixed relative to one another using suitable coupling means. Subsequently, the lifting device is removed from the base so that a structure of the elevator with two components arranged one atop the other is realized.

At this point, it must be noted that the term, "component," in this document and with respect to the present teaching is to be understood in the broadest sense. For example, a component can form a floor of an elevator. Alternatively, a component can be a structural element, e.g., a frame part or a rod system, of a floor, such that several such structural elements are arranged one atop the other and thereby form a floor. Such a construction of a floor from several components arranged one atop the other enables the use of a relatively small and handy lifting device, which does not have to make a very large lifting height possible, but with the disadvantage of several necessary steps of arranging the several components one atop the other in order to construct a complete floor, so that more time is required for constructing a floor than in a case in which one component forms a complete floor.

A method according to the disclosure no longer requires scaffolds or large cranes to be built for the construction or assembly of the elevator. Furthermore, a time-consuming, manual mounting of the individual components in the construction of the elevator is no longer necessary, since the components are pre-assembled in a time-saving manner and merely have to be raised and, prior to that, positioned in a suitable manner on the base. In addition, for the construction of the elevator, assembly personnel need no longer climb onto possibly high scaffolds in a high-risk manner, which significantly increases the safety of the construction of the elevator. This eliminates the complex training of the fitters for working at heights and the extensive equipment to be tested annually, such as personal protection orientation against falls, lifting accessories, and rope rescue equipment. The use of a lifting device acting only in the region of the base and in the lower region of the elevator further simplifies the construction of the elevator in comparison to possibly very large cranes that have a corresponding space requirement and can only be handled with great effort. As a result, considerable cost savings are possible with the method according to the disclosure.

Consequently, by employing a method according to the present disclosure, a quick and safe construction of an elevator is made possible with structurally simple and cost-effective means.

In a particularly advantageous manner, elevators with even significantly more than two components to be arranged one atop the other, and therefore with completely different heights, can be constructed with a method according to the disclosure. In this case, after the step of lowering the upper component onto the lower component by way of the lifting device, the lower component can be raised together with the upper component by way of the lifting device, and a further lower component can subsequently be positioned under the jointly-raised components, whereupon the jointly-raised components are lowered onto the further lower component by way of the lifting device. Subsequently, the three components can then be raised by way of the lifting device, and, afterwards, a further lower component can be positioned under the three raised components. After that, the three raised components can be lowered onto the further lower component so that a structure of four components is then realized. In this respect, further lower components can be introduced in the same way at the bottom or from below into the already existing structure of the elevator. In this respect, the sequence of steps listed last can further, advantageously, take place successively with one or more further lower components in an analogous manner.

It should be noted that the respective inserted lower or further lower components do not necessarily have to have an identical structure. It is only necessary that safe arrangement of the individual components one atop the other be made possible, wherein the components arranged one atop the other can safely be brought into connection with one another and, optionally, must be able to be coupled or fixed to one another by way of coupling devices.

With regard to safe construction or assembly of the elevator, the lifting device can have a control—preferably a frequency control—for the smooth and/or jerk-free raising and/or lowering of the component or of the components. With such a control, the elevator can be prevented from swinging during the construction or assembly, and from falling over in the worst case.

Furthermore, with regard to a particularly safe and simple construction of an elevator, the lifting device can have several individual lifters. Instead of a single lifting device that, possibly, can be handled only with great effort, the task of raising and lowering components can be distributed amongst several individual lifters, which can be designed to be smaller and easier to handle than a single lifting device. With several individual lifters, a relative arrangement of the individual lifters in relation to one another that is particularly favorable for safely raising and lowering components can be realized, wherein the weight distribution and/or the position of the center of gravity of the components to be raised and lowered can be taken into account. For example, more lifters can be positioned in heavier regions of the components to be raised than in lighter regions. With regard to a particularly reliably controllable movement of the raising and lowering, four lifters can, for example, be arranged at different corners of rectangular components. In simple situations, two, cleverly positioned lifters may also be sufficient.

In any case, the lifting device or the lifters can each have a coupling device for coupling to individual components. In this way, particularly safe raising and/or lowering is made possible, wherein the risk of undesired release or slippage of a component or of several components already arranged one atop the other from the lifting device or a lifter during the construction of the elevator can be reduced. For example, such a coupling device can advantageously be designed in the shape of a fork or have a support surface for a component.

Furthermore, with regard to a particularly safe construction of an elevator, the lifters, and preferably a raising and/or lowering of the component or of the components by way of the lifters, can be synchronized by way of a synchronizing device. As a result, a coordinated, uniform, and/or simultaneous lifting and/or lowering movement of the lifters or of pistons of the lifters can be ensured, in order to prevent the lifters from raising or lowering the component or components at different speeds or at different distances per unit time. Undesirably skewed positions of the component or of the components already arranged one atop the other and, in the worst case, tipping over of an already realized structure, which consists of components arranged one atop the other and can, for example, be 20 m or higher, can thereby be avoided.

Furthermore, with regard to a particularly safe construction of an elevator, a vertical orientation of the lifting device or of the lifters can preferably be monitored automatically by way of a sensor system or sensor device. In a particularly advantageous exemplary embodiment of the method according to the disclosure, the vertical orientation can be corrected automatically or manually. A particularly high safety level for the mounting personnel can be provided both by such monitoring and by subsequent correction of the vertical orientation. The risk of a falling lifting device or of falling lifters can be significantly minimized in this way.

The designation, "base," is to be understood in the broadest sense, such that a "base" can be composed of various components and/or regions. Depending upon the application and design of the elevator to be constructed, the base can, for example, have a floor pit or a drive-on ramp in or on which the elevator can be constructed.

As already mentioned above, the lower components can have different designs. Advantageously, however, the lower components, in particular, can preferably have H-shaped frame parts. Such frame parts provide a high stability of the structure of the elevator to be constructed and can be pre-assembled in a simple and time-saving manner prior to the construction of the elevator.

In a specific embodiment of an elevator, an uppermost component of the elevator can be designed in the sense of a head component or mast top, in or on which a switch cabinet or a control device, for example, can be mounted. The underlying, lower components can have doors of the elevator for individual floors or for each floor, for example.

In a specific embodiment of an elevator, the elevator can likewise be a vertical reciprocating conveyor (VRC). Such elevators are known as vertical conveyors for various goods.

Furthermore, with regard to a particularly time-saving and flexible construction of an elevator, at least one component, and preferably all components, or parts of at least one component and/or further structural elements or assemblies of the elevator can be prefabricated—in some cases by several persons and/or teams of persons—prior to the construction of the elevator according to one of claims 1 through 9. This ensures a particularly quick construction of an elevator, with other activities on a construction site or in an already existing and actively-used factory hall being minimally impaired by the construction of the elevator. This prefabrication or pre-assembly can take place at least prior to the step of positioning a lifting device on the base, wherein the case is taken into account here that the base for the elevator is provided on site, and thus possibly at an earlier point in time.

BRIEF DESCRIPTION OF THE SEVERAL VIEWS OF THE DRAWINGS

There are various possibilities for designing and developing the teaching of the present disclosure in an advantageous manner. For this purpose, reference is made on the one hand to the subordinate claims and, on the other, to the following illustration of exemplary embodiments of the method according to the disclosure and of the elevator according to the disclosure on the basis of the drawings. In conjunction with the illustration of the preferred exemplary embodiments of the disclosure on the basis of the drawings, generally preferred embodiments and developments of the teaching are also illustrated. Shown in the drawings are the following:

FIG. 2 shows a schematic plan view of an arrangement consisting of the elevator to be constructed and four lifters in conjunction with the illustration according to FIG. 1.

DETAILED DESCRIPTION

Figure 1:
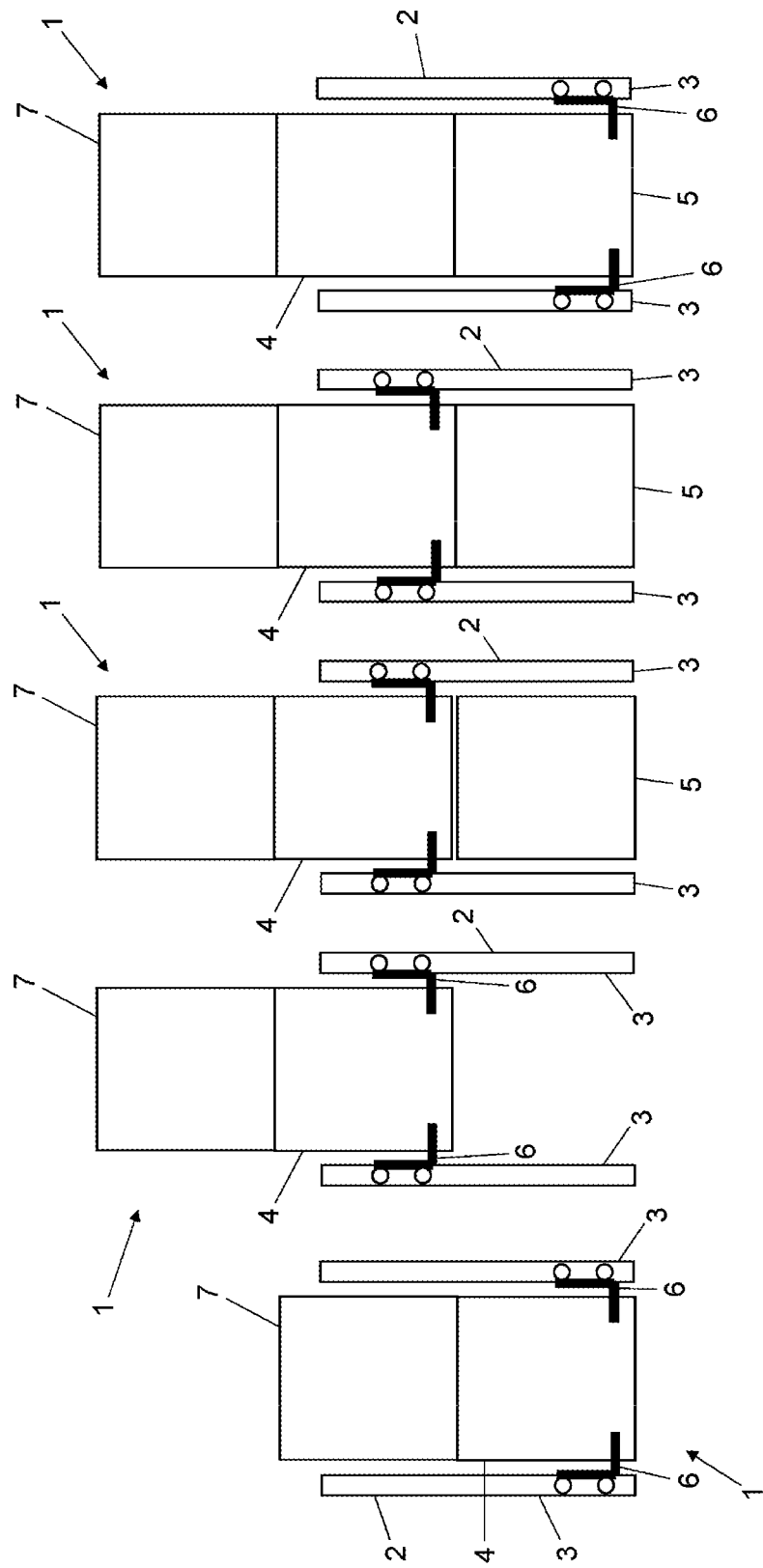
FIG. 1 shows a schematic side view of an illustration of the principle of an exemplary embodiment of the method according to the disclosure for constructing an elevator.

FIG. 1 shows a schematic side view explaining the principle of an exemplary embodiment of a method according to the disclosure for constructing an elevator 1 by way of a lifting device 2 in a sequence of five representations. FIG. 2 shows, in a schematic plan view, the arrangement consisting of elevator 1 to be constructed with the lifting device 2, wherein the combination of FIGS. 1 and 2 shows that the lifting device 2, in this example, has a total of four individual lifters 3.

The exemplary embodiment shown here relates to an elevator 1, e.g., a freight elevator, which is constructed on a construction site—for example, in a factory hall. For this purpose, a base is provided first, which can be or can have a floor pit or a drive-on ramp. Such a floor pit is usually provided on site.

In the exemplary embodiment according to FIG. 1, phases of the construction of an elevator 1 are shown in five representations. In the first representation, on the far left in FIG. 1, a lifting device 2 is already positioned on the base, wherein two of the four lifters 3 of the lifting device 2 can be seen in this side view. In this phase, the lifters 3 are already brought into engagement with an upper component 4. An uppermost component 7 is already positioned above the upper component 4. The lifters 3 each have a coupling device 6 in the form of a fork. The coupling device 6 can also be designed differently, as long as secure engagement with the component 4 or a further component 5 or 7 is realized. The lifters 3 are arranged laterally to the upper component 4, wherein the lifters 3 according to FIG. 2 are arranged substantially at four corners of the elevator 1 or of the upper component 4.

According to the second representation in FIG. 1, the upper component 4 has already been raised, together with the uppermost component 7, by way of the lifters 3, for which purpose the coupling devices 6 or forks of the individual lifters 3 have been moved upwards together. In this case, the components 4 and 7 are raised together high enough that, as shown in the third representation of FIG. 1, a lower component 5 can be positioned under the raised components 4 and 7. Subsequently, according to the fourth representation of FIG. 1, the upper component 4 is lowered together with the uppermost component 7 by way of the lifters 3 onto the lower component 5. Subsequently, the coupling devices 6 of the lifters 3 are moved downwards again according to the fifth representation shown on the far right in FIG. 1. An elevator 1 including three components 5, 4, and 7 would thus be constructed, and the lifters 3 able to be removed from the base.

Otherwise, the lifters 3 can be left at their locations, and the coupling devices 6 can be brought into engagement with the lower component 5 in order to raise, according to the second representation of FIG. 1, the overall structure consisting of the components 5, 4, and 7 and to position, according to the third representation of FIG. 1, a further lower component 5 under this overall structure consisting of the components 5, 4, and 7. This overall structure could subsequently be lowered, according to the fourth representation of FIG. 1, onto the further lower component 5 and to thus form a new overall structure consisting of two components 5 and one component 4 and 7 each, i.e., of a total of four components. In a corresponding manner, a desired number of further lower components 5 can be inserted from below into the overall structure of the elevator 1 in order to construct an elevator 1 of the desired height and with the desired number of floors.

With a view to the most jerk-limited or jerk-free raising and lowering of the respective components 5, 4, and/or 7 possible, the lifting device 2 or the lifters 3 have a frequency-controlled movement device. Furthermore, the lifters 3 can be moved synchronously by way of a synchronizing device in order to largely prevent or to at least reduce to a non-damaging degree any swinging or even falling over of the elevator 1 or of the overall structure during raising and/or lowering. Each lifter 3 can be controlled individually in order to enable the highest possible flexibility of the control and regulation of the movement of the lifters 3.

The components 5, 4, and/or 7 are raised and lowered without further mechanical guidance of the respectively raised components 5, 4, and/or 7. In particular, the components or any structural elements of the components are not guided in an adjacent component or in any structural element of an adjacent component. Thus, raising and lowering takes place in a "free-floating" manner.

In order to ensure the highest possible safety in the construction of the elevator 1, preferably automatic monitoring takes place as to whether the total structure formed in each of the different phases of the construction of the elevator 1 or the finished elevator 1 is vertical or upright. This can take place, for example, by way of suitably positioned light barriers, an electrical water balance, or an electrically-conductive pendulum, which hangs centrally in a sheet metal circle and experiences contact with the sheet metal circle when in an inclined position. As a result, an emergency stop can be triggered in good time prior to an excessively inclined position. In this way, manual correction of the orientation of the overall structure or elevator 1 can be enforced, and raising and/or lowering can subsequently be continued.

The lifters 3 can have running gear with suitable rollers, in order to enable easy displacement of the lifters 3. In this case, the running gear can be brought into a suitable position under the lifters 3 by way of, for example, an operating lever, prior to a desired displacement or movement of the lifters 3. When used as intended, the running gear would then no longer be positioned under the lifters 3, and the lifters 3 could be positioned securely and stably on the base. Alternatively, the lifters 3 could have running gear arranged on one side of the lifters 3 so that a movement or displacement of the lifters 3 could take place after the lifters 3 are tilted toward the running gear. The movement or displacement of the lifters 3 then takes place in a tilted state of the lifters 3.

The lifters 3 used have a structure realized specifically for the described application of constructing an elevator 1. In this case, special motors, transmissions, and control systems, as well as forklifts, are used.

The uppermost component 7 can be designed as a so-called "mast top" and can have one or more shafts, transmissions, and/or motors for the movement of an elevator car of the elevator 1.

Several elevators 1 can be constructed on a construction site with different teams, which each have different tasks, e.g., one team can form the uppermost component 7, a further team can pre-assemble the side structures of the components, and yet a further team can carry out cabling on the uppermost component 7. The teams can work simultaneously on different elevators 1 to be constructed, which considerably saves overall mounting time. In this case, as many tasks as possible can be carried out on the ground before the actual construction of the elevator 1 takes place.

The exemplary embodiment illustrated above is based upon lifters 3 arranged laterally to or outside of the components 5, 4, and/or 7, as shown in FIGS. 1 and 2. The lifters 3 usually stand outside a floor pit, if such a floor pit is used as a base or forms a part of the base. Alternatively, however, the lifters 3 can also be arranged "within" the components 5, 4, and/or 7 in order to construct the elevator 1. In this case, the lifters 3 can stand in a floor pit if such a floor pit is realized as a base or forms a part of the base, and the components 5, 4, and/or 7 can virtually be mounted around the arrangement of lifters 3, even prior to the construction of the uppermost component 7 or after raising the components 5, 4, and/or 7 already provided. A mounted, uppermost component 7 can then be raised by way of the lifters 3, or components 5, 4, and/or 7 already raised can be lowered by way of the lifters 3 onto the component 4 or 5 mounted underneath.

With regard to further advantageous embodiments of the device according to the disclosure, reference is made to the general part of the description and to the appended claims in order to avoid repetition.

Finally, it should be expressly pointed out that the exemplary embodiments described above of the device according to the disclosure serve only to explain the claimed teaching, but do not limit the teaching to the exemplary embodiments. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

LIST OF REFERENCE SIGNS

1 Elevator
2 Lifting device
3 Lifter
4 Upper component
5 Lower component
6 Coupling device
7 Uppermost component

The invention claimed is:

1. A method for constructing an elevator, comprising:
providing a base for the elevator;
positioning a lifting device on the base;
wherein the lifting device has several independently-controllable individual lifters which are positioned on the base;
raising an upper component of the elevator by way of the individual lifters of the lifting device;
positioning a lower component, which is to be arranged underneath the upper component, under the raised upper component;
lowering the upper component onto the lower component by way of the lifting device;
after lowering the upper component onto the lower component by way of the lifting device, the lower component is raised together with the upper component, as jointly-raised components, by way of the individual lifters of the lifting device, and a further lower component is subsequently positioned under the jointly-raised components, whereupon the jointly-raised components are lowered onto the further lower component by way of the lifting device; and
removing the lifting device from the base,
wherein the raising and/or lowering of the upper component and the raising and lowering of the jointly-raised components by way of the individual lifters is synchronized by way of a synchronizing device, whereby each lifter is controlled individually by the synchronizing device, and
wherein a vertical orientation of the elevator is monitored by way of a sensor system or sensor device, and the vertical orientation of the elevator is controlled before further raising and lowering of additional components.

2. The method according to claim 1, wherein the lifting device has a control for smooth and/or jerk-free raising and/or lowering of the upper component or of jointly-raised components.

3. The method according to claim 1, wherein the vertical orientation of the lifting device is automatically monitored by way of the sensor system or sensor device, and the vertical orientation is controlled automatically or manually.

4. The method according to claim 1, wherein the base has a floor pit or a drive-on ramp.

5. The method according to claim 1, wherein the lower component has an H-shaped frame part.

6. The method according to claim 1, wherein an uppermost component of the elevator is a head component or mast top.

7. The method according to claim 1, wherein at least one of the upper component or the lower component is prefabricated prior to construction of the elevator.

8. The method according to claim 7, wherein at least one of the upper component or the lower component is prefabricated prior to the positioning the lifting device on the base.

9. An elevator constructed according to the method of claim 1.

10. The method according to claim 1, wherein the individual lifters each have a coupling device for coupling to individual components.

11. The method according to claim 1, wherein the elevator is a vertical reciprocating conveyor (VRC).

* * * * *